(12) United States Patent
Manabe et al.

(10) Patent No.: US 7,008,210 B2
(45) Date of Patent: Mar. 7, 2006

(54) HOT ISOSTATIC PRESSING APPARATUS

(75) Inventors: Yasuo Manabe, Takasago (JP); Shigeo Kofune, Takasago (JP); Makoto Yoneda, Takasago (JP); Takao Fujikawa, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 154 days.

(21) Appl. No.: 10/437,061

(22) Filed: May 14, 2003

(65) Prior Publication Data

US 2003/0215539 A1   Nov. 20, 2003

(30) Foreign Application Priority Data

May 15, 2002 (JP) .............................. 2002-140767

(51) Int. Cl.
*B29C 43/10* (2006.01)
*B22F 3/15* (2006.01)

(52) U.S. Cl. .................... 425/185; 425/188; 425/405.2; 425/815; 432/199

(58) Field of Classification Search ............. 425/405.2, 425/170, 78, 210, 815; 432/199; 219/400
See application file for complete search history.

(56) References Cited

U.S. PATENT DOCUMENTS

| 4,582,681 A | 4/1986 | Asari et al. |
| 4,720,256 A | 1/1988 | Asari et al. |
| 4,756,680 A | 7/1988 | Ishii |
| 4,921,666 A | 5/1990 | Ishii |
| 5,123,832 A * | 6/1992 | Bergman et al. ......... 425/405.2 |
| 5,251,880 A | 10/1993 | Ishii et al. |
| 6,250,907 B1 * | 6/2001 | Bergman .................... 425/210 |

FOREIGN PATENT DOCUMENTS

| JP | 62-138197 | 8/1987 |
| JP | 8-35785 | 2/1996 |

OTHER PUBLICATIONS

"Isostatic pressing technique", 1988, pp. 144-149.

* cited by examiner

Primary Examiner—Robert Davis
Assistant Examiner—Thu Khanh T. Nguyen
(74) Attorney, Agent, or Firm—Oblon, Spivak, McClelland, Maier & Neustadt, P.C.

(57) ABSTRACT

A treatment chamber for heating and pressing workpieces and a heat insulating structure which covers the treatment chamber sideways and from above are provided within a high-pressure vessel. Below the treatment chamber are disposed a base heater for heating a pressure medium gas and a fan for supplying the pressure medium gas in a heated state into the treatment chamber and stirring the heated gas. The workpieces can be held on the heat insulating structure side, and the heat insulating structure and the workpieces can be taken out from the interior of the high-pressure vessel and can be conveyed together separately from a lower lid of the high-pressure vessel. A hot isostatic pressing apparatus is provided less expensively which can heat and press workpieces at a relatively low temperature of not higher than 600° C. Besides, it is possible to shorten the cycle time in HIP.

6 Claims, 9 Drawing Sheets

FIG. 8C PREHEATING STATION

FIG. 8B HIP STATION

FIG. 8A COOLING STATION

FIG. 9A  HIP STATION

FIG. 9B  PREHEATING/COOLING STATION

FIG. 9C  WORKPIECE LOADING/UNLOADING STATION

HOT ISOSTATIC PRESSING APPARATUS

BACKGROUND OF THE INVENTION

1. Field of the Invention

The present invention relates to a hot isostatic pressing apparatus (HIP apparatus) for economically treating a large quantity of products which can be conveyed in a heated state and in the atmospheric pressure such as, for example, aluminum and magnesium casting products and which are subjected to a hot isostatic pressing (HIP) at a temperature of not higher than 600° C.

2. Description of the Related Art

Hot isostatic pressing (HIP) has come to be widely used for the removal of shrinkage cavity and gas pores from casting products and for the removal of pores remaining in the interiors of sintered products such as ceramics and powder metallurgy products. However, the treatment cost is high which is attributable to a long cycle time, and therefore the utilization of hot isostatic pressing has heretofore been limited to the production of products having a very high added value.

A long time required for cooling after retention at predetermined temperature and pressure and a long heating time required from a relation to heat capacity in a certain quantity of workpieces have been pointed out as causes of a long cycle time.

For solving this problem there have been proposed a preheating type HIP apparatus and a modular HIP apparatus on the basis of the thinking that the time during which workpieces of one batch occupy an expensive high-pressure vessel is to be shortened and that cooling and preheating of workpieces which can be done outside such a high-pressure vessel are to be performed in the exterior of the high-pressure vessel.

In these conventional apparatuses, heaters divided vertically in plural stages are used and temperature control is conducted independently for each stage, that is, plural temperature sensors and plural power sources for heating are required, thus leading to a very high cost.

Moreover, for shortening the cycle time in HIP it is necessary to shorten the high-pressure vessel occupying time of workpieces and therefore, in such a high-efficiency HIP as one cycle time being inside of one hour, it is important that the time for raising pressure and the time for reducing pressure be shortened.

For shortening the pressure raising time and the pressure reducing time it is necessary to inject and discharge a pressure medium gas at high speed into and from a high-pressure vessel. Actually, however, if a pressure medium gas is fed at high speed, there occurs a temperature rising phenomenon due to so-called damming and the temperature of an upper portion of a treatment chamber formed within the high-pressure vessel rises to an excessive degree, so that there occurs a temperature distribution in which it is difficult to control temperature even if electric power to be fed to heaters is controlled. Including this phenomenon, there arises the problem that it is difficult to control the temperature of workpieces, that is, there occurs a large variation in temperature of workpieces and it is difficult to ensure desired mechanical characteristics in the case of a workpiece made of such a material as requires heat treatment.

On the other hand, if HIP is to be followed by a heat treatment such as water quenching or age-precipitation, it is necessary that the workpieces having been subjected to HIP be held at a predetermined temperature. If a pressure medium gas is discharged at high speed, the pressure medium gas present within the high-temperature vessel undergoes a temperature drop due to an adiabatic expansion phenomenon, and thus there is a problem that it is difficult to perform a heat treatment subsequent to HIP.

Moreover, in a preheating type HIP apparatus, workpieces are conveyed in an exposed state to the air, and in a modular type HIP apparatus, heaters used in the HIP apparatus are constructed of a material poor in oxidation resistance, so that it is impossible to expose workpieces to the air at a high temperature and hence in all of the conventional apparatuses it has been impossible to perform a heat treatment subsequent to HIP.

Further, in the conventional apparatuses, since workpieces are conveyed always together with a lower inner lid of a high-pressure vessel, there also is the problem that the workpiece conveying process becomes complicated.

SUMMARY OF THE INVENTION

It is an object of the present invention to solve the above-mentioned problems.

According to a technical means which the present invention has adopted for solving the above-mentioned technical problems there is provided a hot isostatic pressing apparatus for subjecting workpieces to hot isostatic pressing with use of a pressure medium gas, the apparatus comprising a high-pressure vessel, a treatment chamber provided within the high-pressure vessel to heat and press workpieces, a heat insulating structure which covers the treatment chamber sideways and from above, a base heater disposed below the treatment chamber to heat a pressure medium gas, a fan disposed below the treatment chamber to supply the pressure medium gas in a heated state into the treatment chamber and stir the heated gas, and a lower lid of the high-pressure vessel. The heat insulating structure and the workpieces can be taken out together from the interior of the high-pressure vessel and can be conveyed together separately from the lower lid.

According to the present invention, since a base heater for heating a pressure medium gas and a fan for supplying the heated pressure medium gas into a treatment chamber and stirring the heated gas are disposed below the treatment chamber, for example in a hot isostatic pressing apparatus of the type which heats and presses workpieces at a relatively low temperature of not higher than 600° C., it is possible to heat the workpieces efficiently and the apparatus can be provided as a less expensive apparatus.

Besides, since the apparatus is provided with such base heater and fan, workpieces are heated and pressed within the treatment chamber while a heated pressure medium gas is supplied into the treatment chamber and is stirred by means of the fan, whereby it is possible to suppress a temperature variation (occurrence of a temperature distribution) caused by a temperature rise due to damming which occurs upon high-speed injection of a pressure medium gas into the high-pressure vessel. As a result, it is possible to shorten the time required for raising pressure by the pressure medium gas within the high-pressure vessel and hence possible to shorten the HIP cycle time.

Moreover, since the workpieces and the heat insulating structure are taken out from the high-pressure vessel and can be conveyed together in a separate manner from the lower lid, even if the workpieces are conveyed together with the heat insulating structure to a heat treatment side in the air, the conveyance can be carried out while maintaining a predetermined temperature. Further, the heat treatment after HIP can be combined with HIP as part of a series of steps, whereby it is possible to shorten the total process time in the heat treatment. Additionally, the conveyance process can be simplified because the workpieces and the heat insulating structure are not conveyed together with the lower lid.

The hot isostatic pressing apparatus of the present invention may be constructed so that at the time of discharging the pressure-medium gas from the interior of the high-pressure vessel after subjecting the workpieces to heating and pressing, the base heater and the fan are operated.

By operating the base heater and the fan at the time of discharging the pressure medium gas from the interior of the high-pressure vessel after subjecting the workpieces to heating and pressing, it is possible to prevent a temperature drop caused by adiabatic expansion which occurs upon high-speed discharge of the pressure medium gas from the interior of the high-pressure vessel. Consequently, in the case where heat treatment follows HIP and the pressure medium gas is to be discharged at high speed from the interior of the high-pressure vessel, the workpieces can be held at a predetermined temperature, so when HIP is immediately followed by heat treatment, it is possible to shorten the time required for pressure reduction by the pressure medium gas within the high-pressure vessel and hence possible to shorten the HIP cycle time.

The hot isostatic pressing apparatus of the present invention may be constructed such that the base heater and the fan are fixed to the lower lid and a station is provided outside the high-pressure vessel. The said station is provided with a heating unit having almost the same functions as the base heater and the fan both installed in the high-pressure vessel, and performs at least one of preheating and cooling for the workpieces.

Thus, in the hot isostatic pressing apparatus of the present invention there also is included a mode wherein a station is separately provided outside the high-pressure vessel as part of a system. In such a mode, a combination of the high-pressure vessel and the station is designated a hot isostatic pressing apparatus.

Thus, the base heater and the fan are fixed to the lower lid and a station having almost the same functions as the base heater and the fan is installed outside the high-pressure vessel to preheat and/or cool the workpieces. In the said station, the interior of the heat insulating structure can be heated up to a predetermined temperature in a short time and therefore it is possible to preheat workpieces efficiently. Further, in case of cooling workpieces, not only the cooling rate can be controlled by the base heater and the fan, but also the occurrence of a temperature distribution can be suppressed, whereby cooling, e.g., slow cooling, can be done to a satisfactory extent for the workpieces.

The hot isostatic pressing apparatus of the present invention may be constructed such that the base heater and the fan are attached to the lower lid removably and, together with workpieces and the heat insulating structure, can be taken out from the interior of the high-pressure vessel and conveyed, and a station is installed outside the high-pressure vessel. The station can operate the base heater and the fan and can perform at least one of preheating and cooling for the workpieces.

Even with such a construction, like the foregoing, preheating is made efficient and cooling such as slow cooling can be done in a satisfactory manner.

The hot isostatic pressing apparatus of the present invention may be constructed such that the lower lid is movable vertically and, in a descended state of the lower lid, the heat insulating structure can be attached to and detached from the lower lid.

The hot isostatic pressing apparatus of the present invention may be constructed such that an upper lid for closing an upper-end opening of the high-pressure vessel is provided and, in an opened state of the upper lid, the heat insulating structure is taken into and out of the high-pressure vessel through the upper-end opening of the vessel.

The hot isostatic pressing apparatus of the present invention may be further provided with a water quenching station in which workpieces taken out together with the heat insulating structure from the high-pressure vessel and conveyed together with the heat insulating structure after subjected to heating and pressing are dipped in a water tank.

According to another technical means which the present invention has adopted for solving the foregoing problems there is provided a hot isostatic pressing apparatus for subjecting workpieces to hot isostatic pressing with use of a pressure medium gas, the apparatus comprising a high-pressure vessel, a treatment chamber provided within the high-pressure vessel to heat and press workpieces, a base heater disposed below the treatment chamber to heat a pressure medium gas, and a fan disposed below the treatment chamber to supply the pressure medium gas in a heated state into the treatment chamber and stir the heated gas, wherein the base heater and the fan are operated at the time of discharging the pressure medium gas from the interior of the high-pressure vessel after subjecting the workpieces to heating and pressing.

DESCRIPTION OF THE PREFERRED EMBODIMENTS

Embodiments of the present invention will be described in detail hereinunder with reference to the accompanying drawings.

Figure 1:
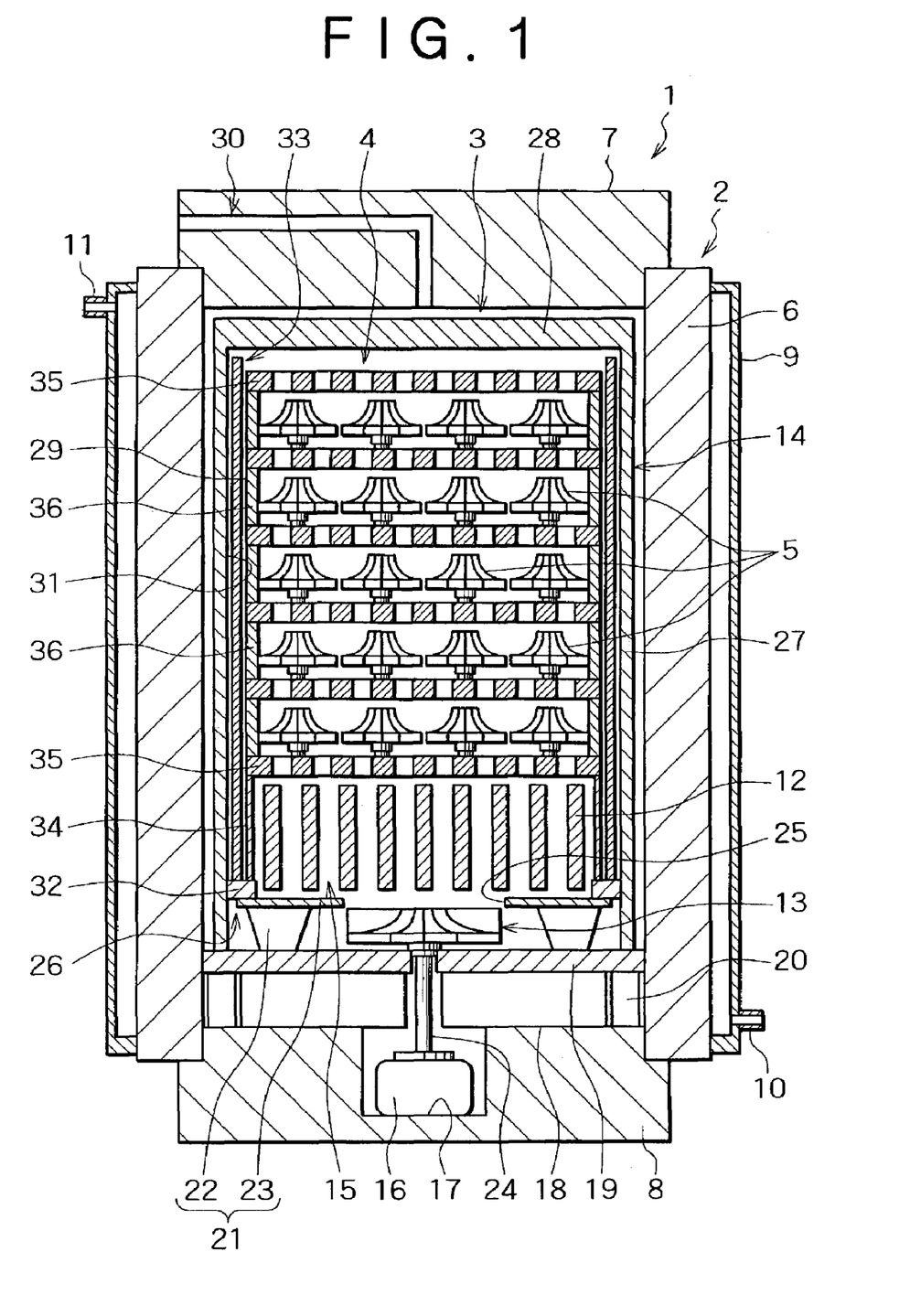
FIG. 1 is a sectional view of a high-pressure vessel and an electric furnace according to a first embodiment of the present invention.

FIGS. 1 to 5 illustrate a first embodiment of the present invention, of which FIG. 1 is schematically illustrates a body portion of a hot isostatic pressing apparatus (HIP apparatus) 1 according to the first embodiment.

The HIP apparatus 1 is provided with a high-pressure vessel 2 and an electric furnace 3 installed within the high-pressure vessel 2. Workpieces 5 are heated within a treatment chamber 4 formed in the electric furnace 3, and a pressure medium gas is injected into the high-pressure vessel 2 to heat and press (HIP) the workpieces 5.

The high-pressure vessel 2 is provided with a high-pressure cylinder 6 having a vertical axis and upper-end and lower-end openings, an upper lid 7 which closes the upper-end opening of the high-pressure vessel 6, and a lower lid 8 which closes the lower-end opening of the high-pressure vessel 2. Loads acting on the upper and lower lids 7, 8 under the pressure of the pressure medium gas injected into the high-pressure vessel 2 are borne by a window frame-like press frame (not shown).

In the upper lid 7 is formed a gas flow path 30 for injection and discharge of the pressure medium gas into and from the interior of the high-pressure vessel 2.

The lower lid 8 is supported vertically movably and closes the lower-end opening of the high-pressure vessel 2 so that the lower-end opening can be opened.

Outside the high-pressure cylinder 6 is mounted a water jacket 9 for the passage of cooling water therethrough to suppress a temperature rise due to heat generated in the interior. Cooling water is introduced into the water jacket 9 from a cooling water inlet 10 formed in a lower position. The cooling water thus introduced into the water jacket 9 is discharged from a cooling water outlet 11 formed in an upper position.

The electric furnace 3 is provided with a base heater 12 for heating the pressure medium gas to heat up the workpieces 5, a fan 13 for creating a forced convection of the pressure medium gas heated by the base heater 12 and for supplying the pressure medium gas into the treatment chamber 4 and stirring it to realize uniform temperature, and a heat insulating structure 14 for preventing an excessive temperature rise caused by the radiation of heat into the high-pressure vessel 2.

The base heater 12 and the fan 13 are fixed to the lower lid 8, while the heat insulating structure 14 is mounted to the lower lid 8 removably.

The base heater 12 is disposed below the treatment chamber 4 and is supported on a support base 21 which is installed on the lower lid 8.

The base heater 12 has gaps 15 for permitting a vertical flow of the pressure medium gas.

The fan 13 is disposed below the base heater 12 centrally in the interior of the high-pressure vessel 2 and is constructed so as to be rotated about a vertical axis thereof to suck in the pressure medium gas sideways (from the periphery) in the lateral direction (horizontal direction) and discharge it upward.

A motor 16 for driving the fan 13 is received within a concave portion 17 formed downward from an upper surface of the lower lid 8 and is fixed to the lower lid 8.

On the lower lid 8 is provided a ceramic material as a heat insulating material 18 to prevent damage of the motor 16 due to heat generated from the base heater 12. On an upper surface side of the heat insulating material 18 is disposed a disc-like partition wall 19 for preventing a downward flow of the pressure medium gas and a downward transmission of heat. The partition wall 19 is supported by support legs 20 which are mounted in an outer periphery portion on the lower lid 8.

The support base 21 is mainly composed of support legs 22 fixed onto the partition walls 19 and a support plate 23 fixed onto the support legs 22. The fan 13 is disposed within a space formed between the support plate 23 and the partition wall 19, the support legs 22 are positioned laterally outwards of the fan 13, and the base heater 12 is supported on the support plate 23 spacedly from the support plate.

An output shaft 24 of the motor 16 extends through the heat insulating material 18 and the partition wall 19 and is connected to the fan 13.

The support plate 23 of the support base 21 is formed in a disc shape, and in a central part thereof corresponding to the fan 13 there is formed an aperture 25 for upward flow of the pressure medium gas discharged from the fan 13.

The support legs 22 permit a side flow of the pressure medium gas, while the support plate 23 does not permit flow of the pressure medium gas.

Further, a clearance 26 is formed between an outer periphery of the support plate 23 and an inner periphery surface of the high-pressure cylinder 6.

In the above construction, the base heater 12 and the fan 13 are fixed to the lower lid 8, and the heat insulating structure 14 is mounted removably from above to the lower lid 8 while allowing the base heater 12 and the fan 13 to remain on the lower lid 8.

The heat insulating structure 14 is made up of a cylindrical body 27 which covers the treatment chamber 4 sideways and an upper wall 28 which closes an upper-end opening of the cylindrical body 27 and covers the treatment chamber 4 from above. The heat insulating structure 14 is open at a lower end thereof.

The heat insulating structure 14 is rested and supported on the partition wall 19 and also covers the base heater 12, the fan 13 and the support base 21.

Further, a convection cylinder 29 for efficient convection (circulation) of the pressure medium gas is disposed between the heat insulating structure 14 and the workpieces 5.

The convection cylinder 29 has a vertical axis and is constituted by a cylinder having upper and lower open ends. The convection cylinder 29 surrounds the treatment chamber 4 sideways and a clearance 31 is formed between the convection cylinder 29 and the heat insulating structure 14 to the pressure medium gas to flow therethrough.

A receiving portion 32 is provided removably on a lower portion of an inner periphery of the heat insulating structure 14 so that it is put in abutment against an upper surface of the support plate 23 of the support base 21, and the convection cylinder 29 is rested and supported on the receiving portion 32. A clearance 33 for the flow therethrough of the pressure medium gas is formed between an upper end of the convection cylinder 29 and an upper wall 28 of the heat insulating structure 14.

The receiving portion 32 permits a vertical flow of the pressure medium gas.

A support cylinder 34 is disposed on an inner periphery side of the convection cylinder 29 and laterally outside of the base heater 12 (i.e., between the convection cylinder 29 and the base heater 12), and it is rested and supported on the receiving portion 32.

Within the treatment chamber 4 on the support cylinder 34, disc-like workpiece bases 35 for resting workpieces 5 thereon are arranged vertically in multiple stages.

More specifically, a workpiece base 35 located at the lowest stage is rested on the support cylinder 34, and on that workpiece base 35 is rested another workpiece base 35 through a cylindrical support member 36 which maintain a spacing for receiving workpieces between the upper and the lower workpiece base 35. Then, in the same manner as above, a further workpiece base 35 is stacked through the support member 36 onto the thus-stacked workpiece base 35.

Each workpiece base 35 is vertically formed with through holes to permit the pressure medium gas to flow vertically therethrough.

According to the above construction, the workpieces 5 can be held by the heat insulating structure 14 and these can be conveyed together.

Further, according to the above construction, by lowering the lower lid 8 of the high-pressure vessel 2, the workpieces 5 can be taken out from the interior of the high-pressure vessel 2 together with the heat insulating structure 14 and can be conveyed together with the heat insulating structure 14 and separately from the lower lid 8, base heater 12 and fan 13.

A characteristic feature of the HIP apparatus 1 according to the present invention resides in the portion of the electric furnace 3.

The treatment temperature for the workpieces to be treated by the HIP apparatus 1 according to the present invention is not higher than 600° C. and is thus low in comparison with that (1000° C. or higher) in the conventional HIP apparatus, so that there is little heating effect based on radiation heat.

Thus, the utilization of convection of the pressure medium gas is more suitable for heating the workpieces 5 efficiently. The base heater 12 for heating is disposed below the workpieces 5 and there is utilized a rising flow of the pressure medium gas heated by the base heater 12. Further, a forced convection induced by the fan 13 is utilized for increasing the flow rate to promote the transfer of heat.

Figure 2:
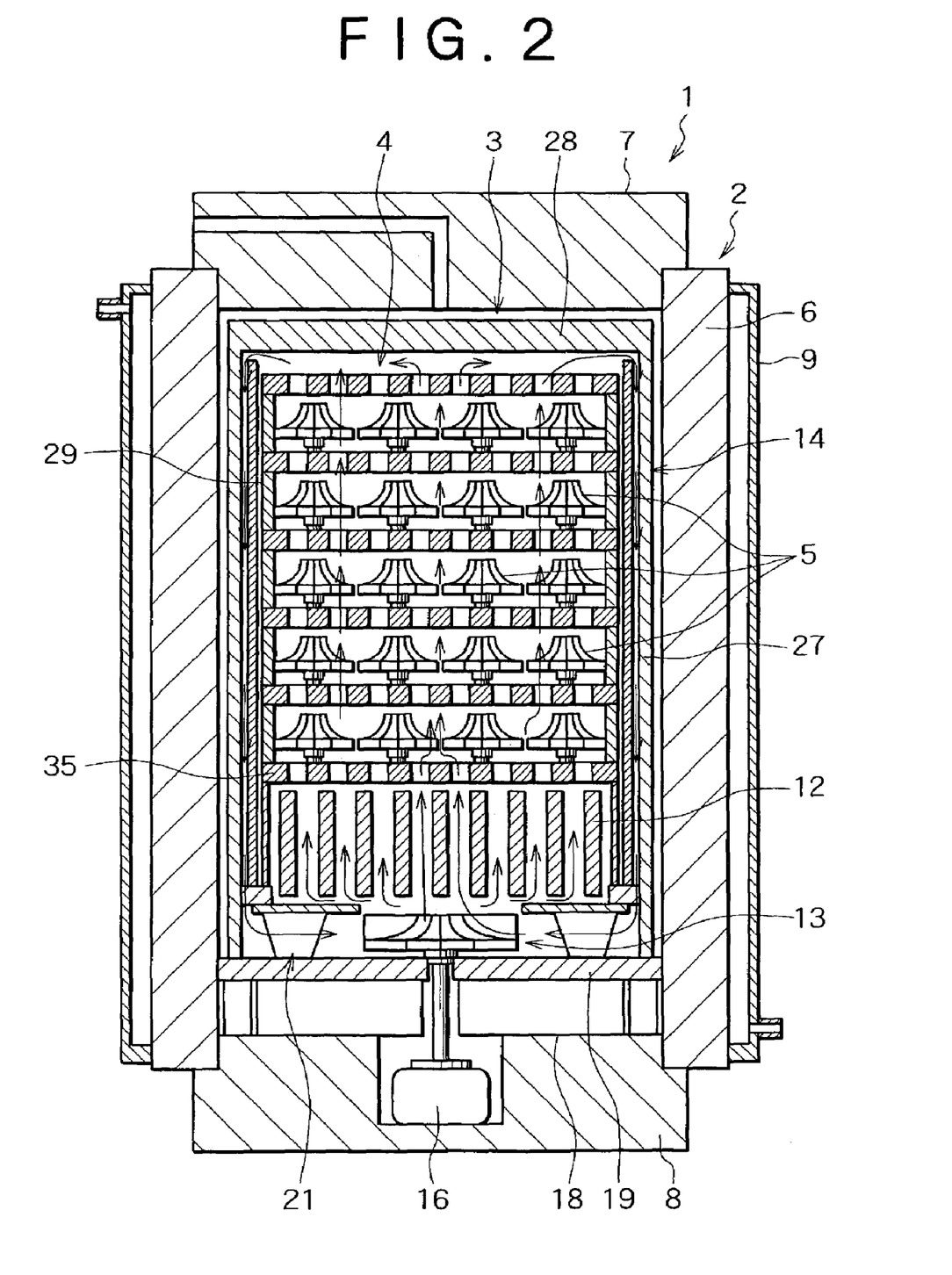
FIG. 2 is a sectional view showing a pressure medium gas flowing route in the electric furnace in the first embodiment.

The flow of the pressure medium gas by the fan 13 is as shown in FIG. 2.

To be more specific, the pressure medium gas which has been sucked into the fan 13 from the side space of the fan is discharged upward, causing the pressure medium gas which has been heated in the disposed space of the base heater 12 to flow upward forcibly to heat the workpieces 5 present within the treatment chamber 4 which is defined by the convection cylinder 29.

With the suction force of the fan 13, the pressure medium gas flowing upward through the treatment chamber 4 reaches an upper end portion of the treatment chamber, passes through the clearance 33 formed between the convection cylinder 29 and the upper wall 28 of the heat insulating structure, then flows downward through the space formed outside the convection cylinder, further passes through the clearance 26 formed between the support plate 23 of the support base 21 and the heat insulating structure 14, and reaches a side portion of the fan 13. Thus, the pressure medium gas circulates through the foregoing pressure medium gas flowing route.

The stirring and forced convection by the fan 13 is not only effective during treatment of the workpieces 5 at a high pressure but also very effective for suppressing the occurrence of a temperature distribution caused by a temperature rise due to damming at the time of rapid pressing (rapid injection of the pressure medium gas).

Figure 3:
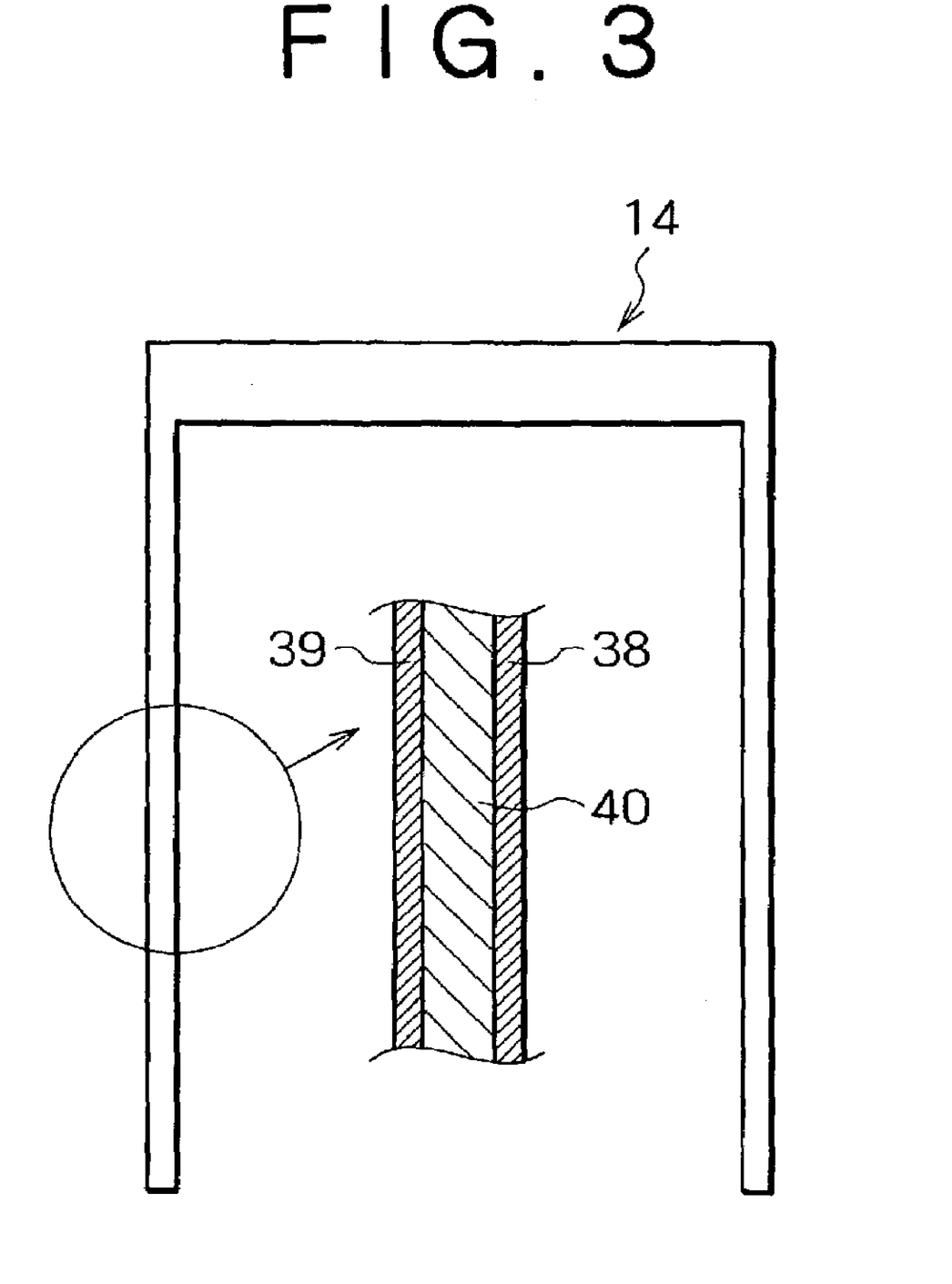
FIG. 3 is a sectional view showing the construction of a heat insulating structure.

A most suitable example of the heat insulating structure 14 is as shown in FIG. 3, in which ceramic blanket 40 for heat insulation is filled between two metallic, reversed tumbler-like, inner and outer walls 38, 39.

Figure 4:
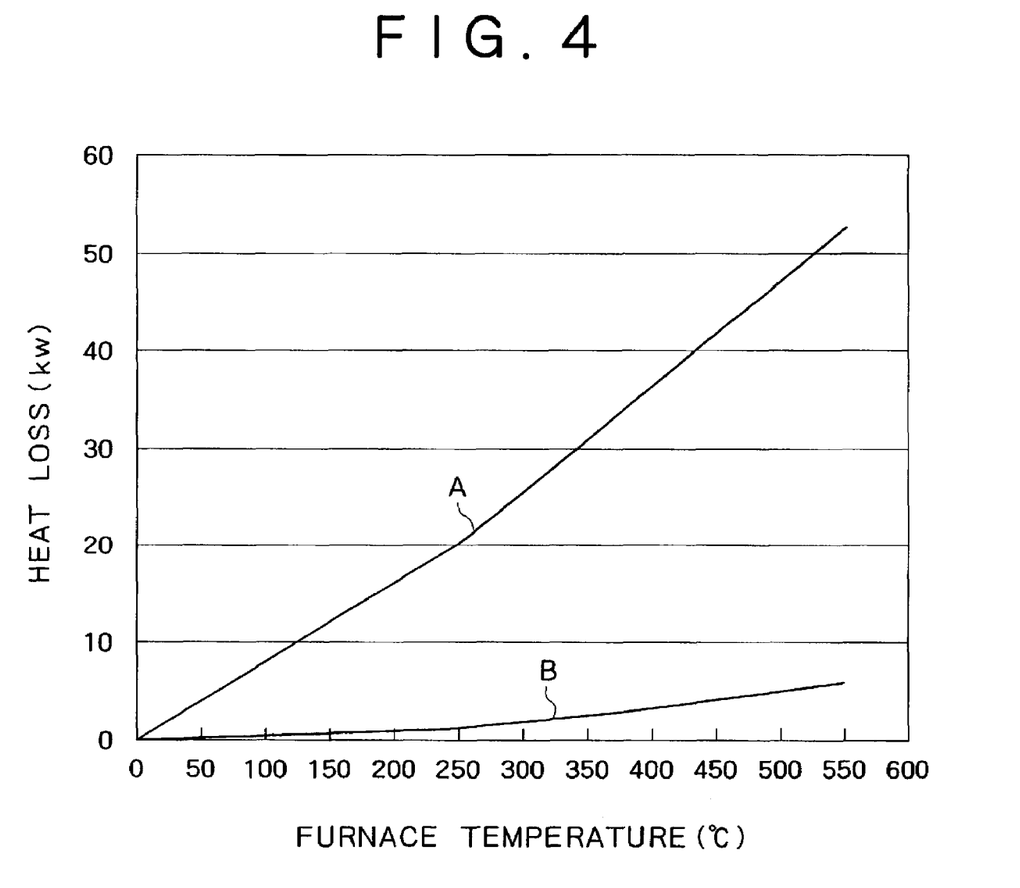
FIG. 4 is a graph showing a heat loss characteristic of the heat insulating structure.

FIG. 4 shows a heat loss characteristic A in a high pressure nitrogen atmosphere and a heat loss characteristic B in the atmospheric pressure in such a heat insulating structure 14 (inside diameter 700 mm, inside height about 1000 mm), in which the internal temperature of the treatment chamber and heat loss are plotted along the axis of abscissa and the axis of ordinate, respectively.

As is seen from FIG. 4, in a high pressure condition, the heat insulating structure 14 exhibits a heat insulating performance satisfactory in practical use although the amount of heat radiated is fairly large.

The amount of heat radiated under the atmospheric pressure is very small and is one eighth to one tenth as large as that in a high pressure condition.

Therefore, when the workpieces 5 (e.g., 100 kg of workpieces, using the heat insulating structure 14 of the foregoing size) are received within the heat insulating structure, a drop of the internal temperature can be made not higher than 10° C. even after standing for 30 minutes.

This indicates that in case of preheating the workpieces 5 under the atmospheric pressure, an extremely energy-saving preheating can be realized by performing the preheating with the workpieces received within the heat insulating structure 14 and a heat source disposed at a lower position, the heat source being a combination of the base heater 12 and the fan 13 both disposed within the high-pressure vessel 2.

As will be apparent also from the foregoing explanation on the heat loss characteristics (heat insulating performance) of the heat insulating structure 14, the electric furnace 3 used in this embodiment is very effective in the case where preheating or cooling such as slow cooling is necessary.

Figure 5A:
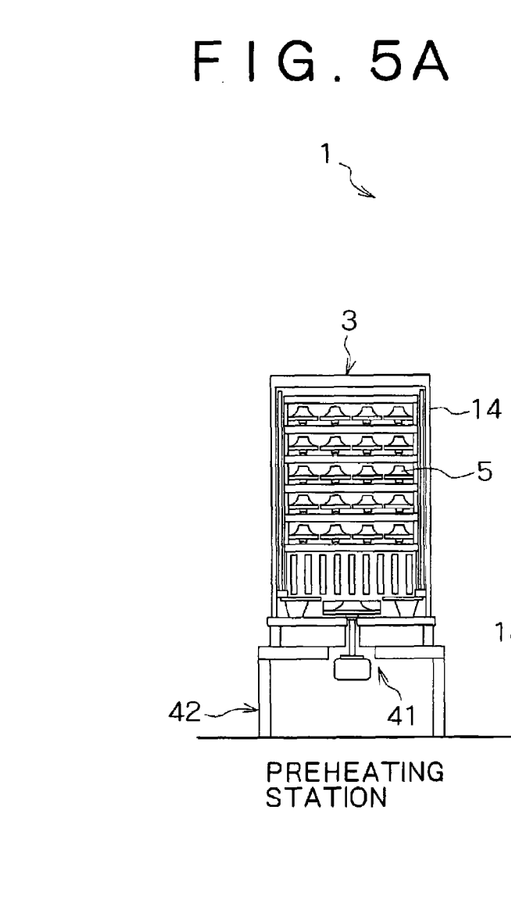
FIG. 5 is a construction diagram showing an example of an HIP apparatus in the first embodiment.
Figure 5B:
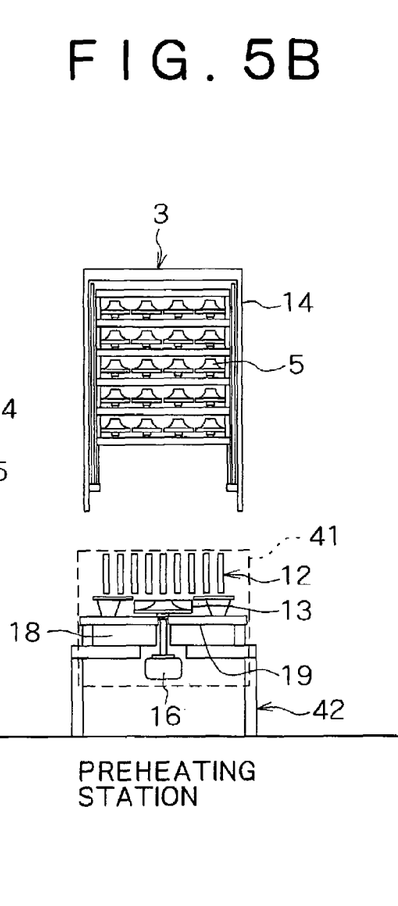
Figure 5C:
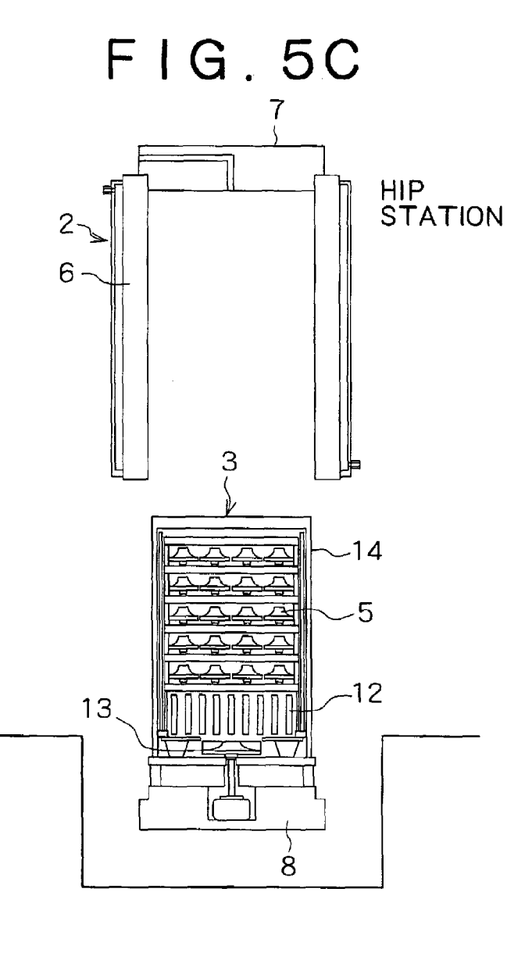

FIG. 5 shows such an example, i.e., an example of an HIP apparatus 1. This HIP apparatus 1 is provided with the electric furnace 3, an HIP station in which the high-pressure vessel 2 is disposed to carry out HIP, and two preheating stations.

For taking out the workpieces 5 from the high-pressure vessel 5 there is adopted a construction wherein, as noted earlier, the lower lid 8 is brought down, then the workpieces 5, heater 12, fan 13 or the like, and the heat insulating structure 14 (i.e., the whole of the electric furnace 3) are drawn out together with the lower lid 8. The heater 12 and the fan 13 are fixed to the lower lid 8, the workpieces 5 can be conveyed together with the heat insulating structure 14, and the heat insulating structure 14 can be separated from the lower lid 8.

With a crane or the like, the workpieces 5 are conveyed together with the heat insulating structure 14 to the preheating stations installed outside the high-pressure vessel 2.

In each preheating station, a heater 41 for preheating is installed on a base 42, the heater 41 having a base heater 12 and a fan 13 which are the same or almost the same in size and function as the base heater 12 and the fan 13 used in the HIP station.

The heater 41 is further provided with the same support base 21, partition wall 19, heat insulating material 18, and motor 16 as those used in the HIP station.

In this HIP apparatus 1 (preheating HIP system), in a set position (not shown) thereof, the support cylinder 34, workpiece base 35 and support member 36 are mounted onto the receiving portion 32, workpieces 5 are rested on the workpiece base 35, and thereafter the convection cylinder 29 is mounted onto the receiving portion 32. Then these components are covered with the heat insulating structure 14 and the receiving portion 32 is connected to the heat insulating structure 14. Thereafter the heat insulating structure 14 is conveyed to a preheating station and is positioned so that the base heater 12 and the fan 13 are received in the space formed below the workpieces 5 within the heat insulating structure 14. Then the heat insulating structure 14 is rested on the partition wall 19 of the heater 41, and electric power is applied to the heater 41 to raise the temperature up to a predetermined temperature.

At this time, since the heat insulating structure 14 has an extremely good heat insulating characteristic, the temperature can be raised to the predetermined temperature in a short time and there is no heat loss during retention.

After retention for a predetermined time, the workpieces 5 are conveyed together with the heat insulating structure onto the lower lid 8 located at a descent position of the high-pressure vessel 2 by means of a crane or the like.

In the conventional preheating furnace, workpieces are conveyed in an exposed state to the air. Therefore, if the workpieces are thin, there is a fear that there may occur a temperature drop at this conveyance stage and a fine texture of the material of the workpieces may be damaged. But in this embodiment, even if thirty minutes are taken for the conveyance, a temperature drop is not higher than 10° C. and thus poses no problem in practical use.

In the case where cooling such as slow cooling is required for the workpieces 5 after HIP, the workpieces 5 are conveyed together with the heat insulating structure 14 to the preheating station and are subjected to cooling (slow cooling).

In this case, since the base heater 12 and the fan 13 are provided in the preheating station, it is possible to easily control the cooling rate (slow cooling rate) and also possible to suppress the occurrence of a vertical temperature distribution in the treatment chamber 4.

Although in the above example a preheating station (a preheating/cooling station) for both preheating and cooling (slow cooling) is used as each of the preheating stations, only preheating may be performed, or there may be separately provided one or plural cooling stations (slow cooling stations) of approximately the same structure as the preheating station to perform only cooling (slow cooling).

Further, one or three or more such preheating stations as described above may be provided.

In the case where the workpieces 5 are aluminum alloy casting products, it is sometimes required for the workpieces 5 to be subjected to such heat treatments as solution treatment, water quenching, and age-precipitating treatment, (T6 treatment).

In the conventional HIP for alloy materials there usually are conducted such heat treatments after HIP, but by the application of the present invention it becomes possible to combine such heat treatments with HIP.

More particularly, it is possible to carry out the following treatment. After maintained at a solution treatment temperature for a predetermined time in a preheating station, the workpieces 5 are conveyed to the HIP station (high-pressure vessel 2) while being held at a high temperature and are subjected to HIP therein. Then, while maintaining the temperature substantially at the solution treatment temperature even after HIP, the workpieces 5 and the heat insulating structure 14 are conveyed in the air to a water quenching station and are dipped into a water quenching tank (not shown).

Particularly, under a high pressure, in the case of an aluminum casting alloy, e.g., Al—Si-base alloy, there is an advantage that a short solution treatment time suffices, which is due to expansion of the solubility limit from 1.5% Si in the atmospheric pressure to 1.9% Si. It becomes possible to greatly shorten this heat treatment time, as well as the HIP time.

According to this structure, the base heater 12 can be taken out from the interior of the high-pressure vessel 2 in a simple manner, so that it is extremely easy to make repair and maintenance in the event of a failure.

To the HIP apparatus 1 constructed as above there also may be applied a construction wherein the upper lid 7 of the high-pressure vessel 2 is opened and the workpieces 5 and the heat insulating structure 14 are hung up together and taken out from the high-pressure vessel 2.

If the workpieces 5 and the heat insulating structure 14 thus hung up are conveyed to a preheating station as in the previous example, it is possible to perform the same operation as above.

Such an upward withdrawing structure is effective in reducing the cost of the body of the HIP apparatus 1 because it is not necessary to use a complicated lift mechanism for the lower lid 8.

By using the HIP apparatus 1 of the present invention it becomes possible to realize an HIP system of high productivity for hot isostatic pressing a large quantity of aluminum alloy casting products or the like.

In more particular terms, for shortening the HIP cycle time, it is necessary to shorten the time during which the high-pressure vessel 2 is occupied by the workpieces 5. In HIP of such a high frequency as one cycle time being within one hour, it is an important subject to shorten the time for raising pressure and the time for reducing pressure.

To meet this requirement it is necessary to effect high-speed injection and discharge of gas. But actually a temperature variation caused by the foregoing rise in temperature due to damming occurs during high-speed injection of gas, and during high-speed discharge of gas the gas present within the high-pressure vessel undergoes a temperature drop due to adiabatic expansion. Therefore, it is difficult to maintain a predetermined temperature for example in case of performing T6 heat treatment in combination with HIP.

However, such a problem is solved by the foregoing "base heater-fan combined structure" and "integral handling of both workpieces and heat insulating structure."

As a result, the improvement in quality by HIP of mass-produced aluminum casting parts for automobiles can be attained in an extremely economical manner, thus making great contribution to the development of the automobile industry.

Figure 6:
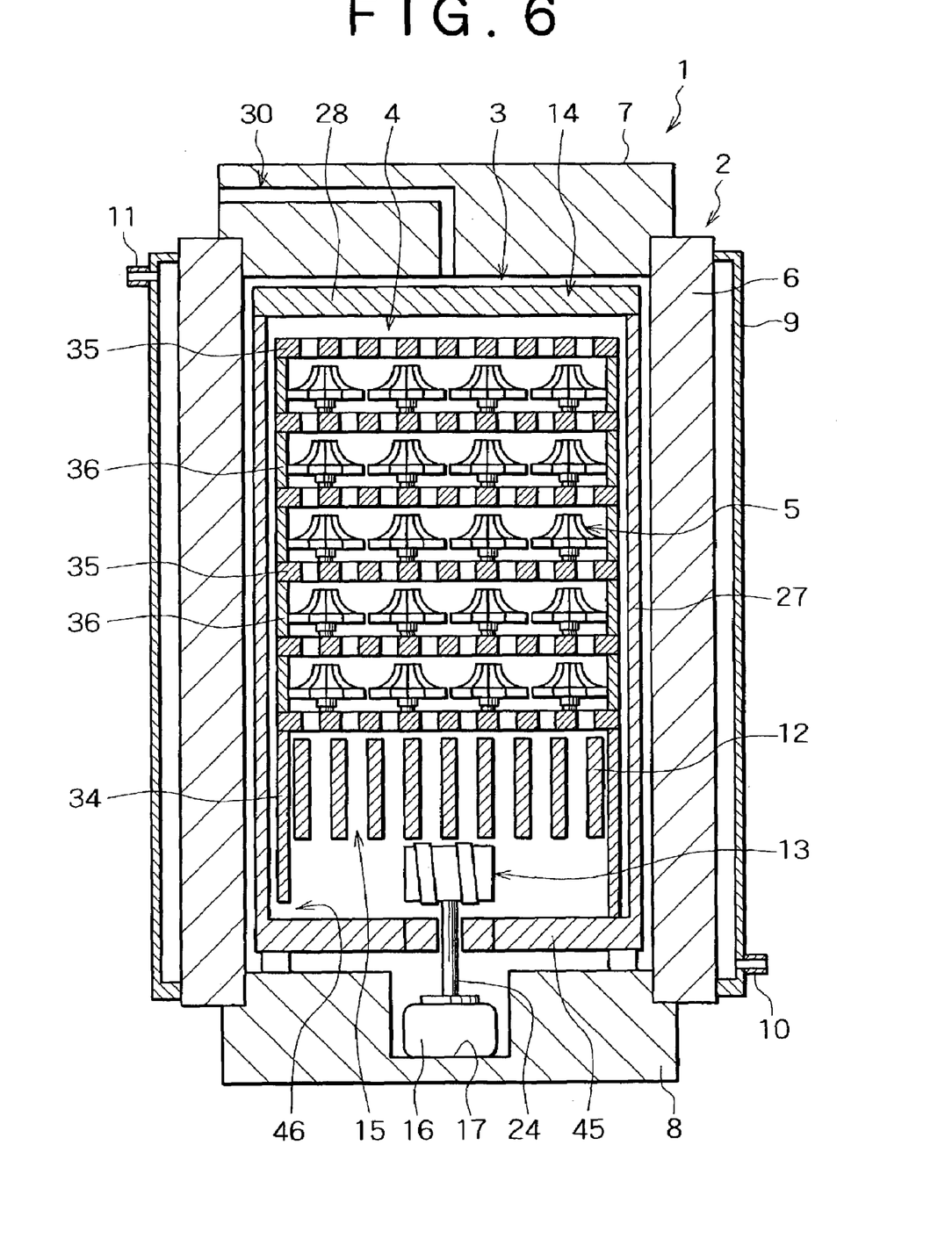
FIG. 6 is a sectional view of a high-pressure vessel and an electric furnace according to a second embodiment of the present invention.
Figure 7:
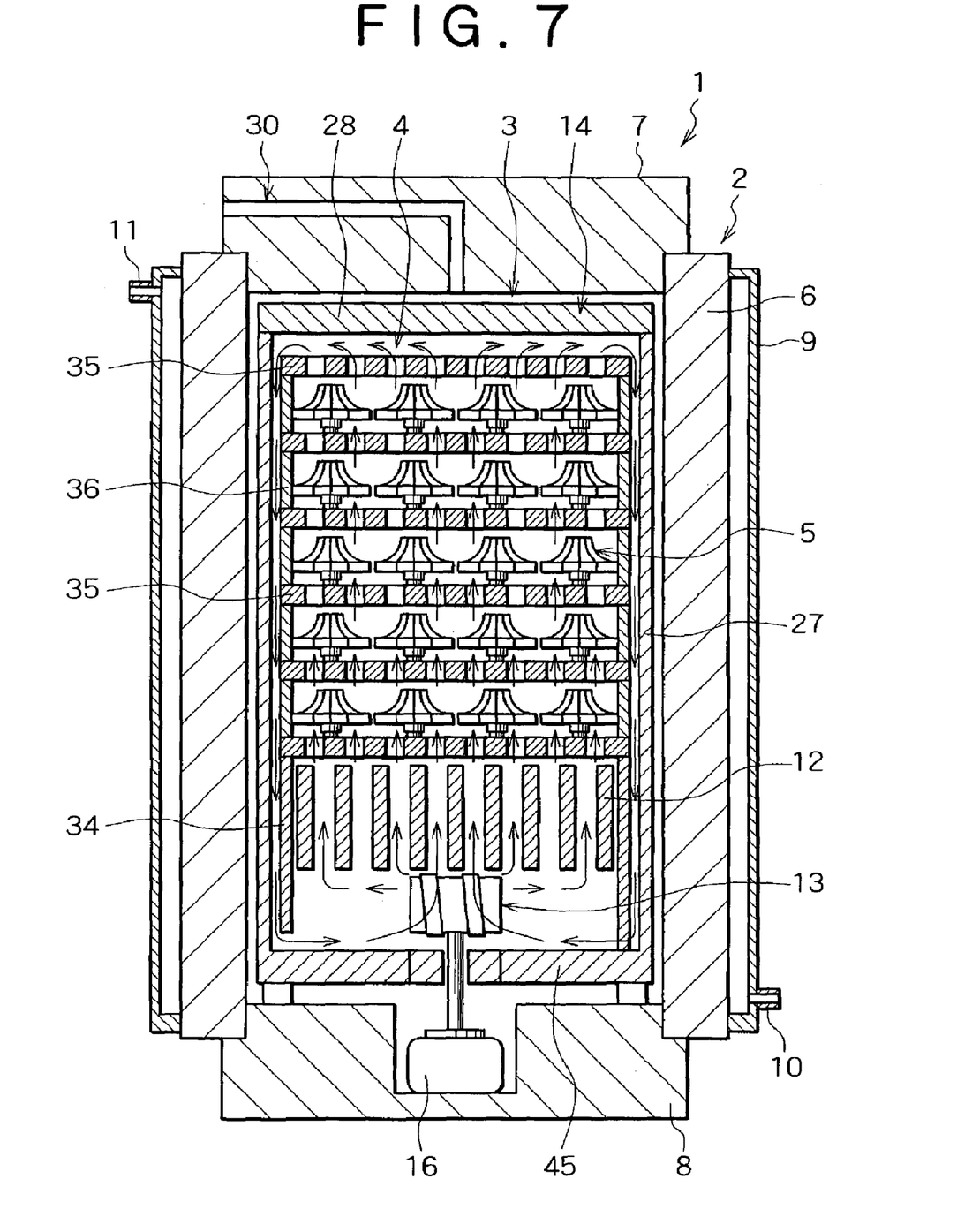
FIG. 7 is a sectional view showing a pressure medium gas flowing route in the electric furnace in the second embodiment.
Figure 8A:
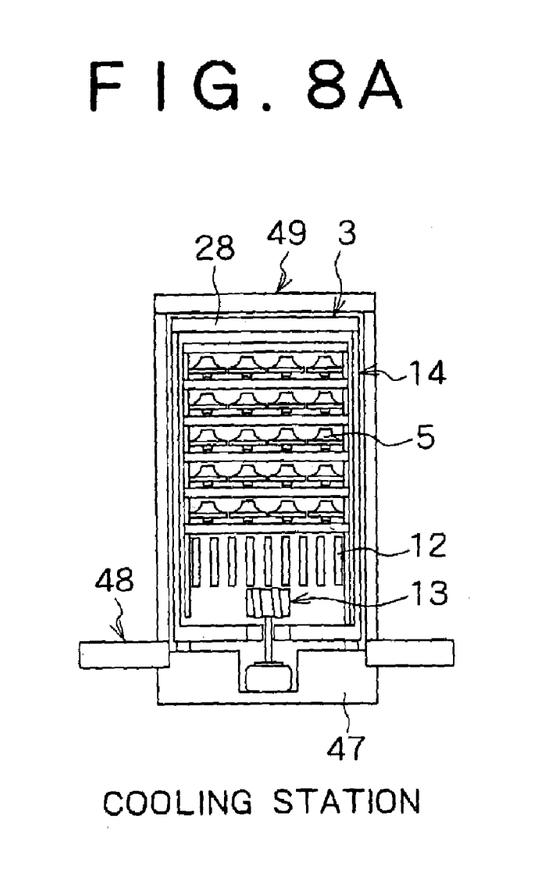
FIG. 8 is a construction diagram showing an example of an HIP apparatus in the second embodiment.
Figure 8B:
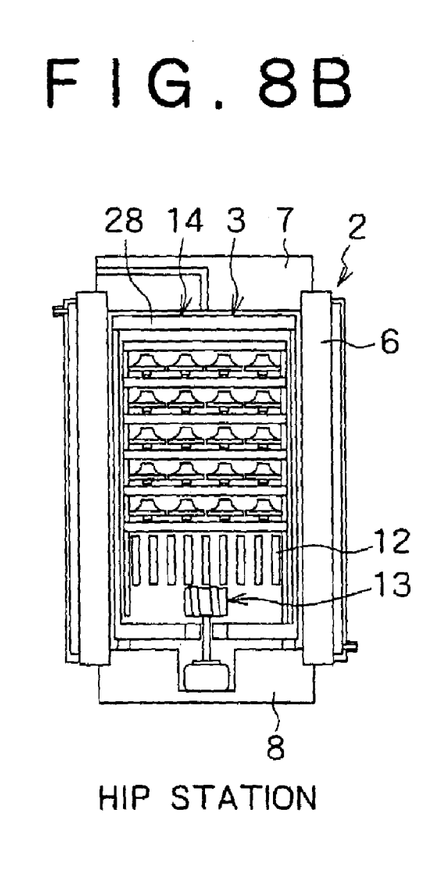
Figure 8C:
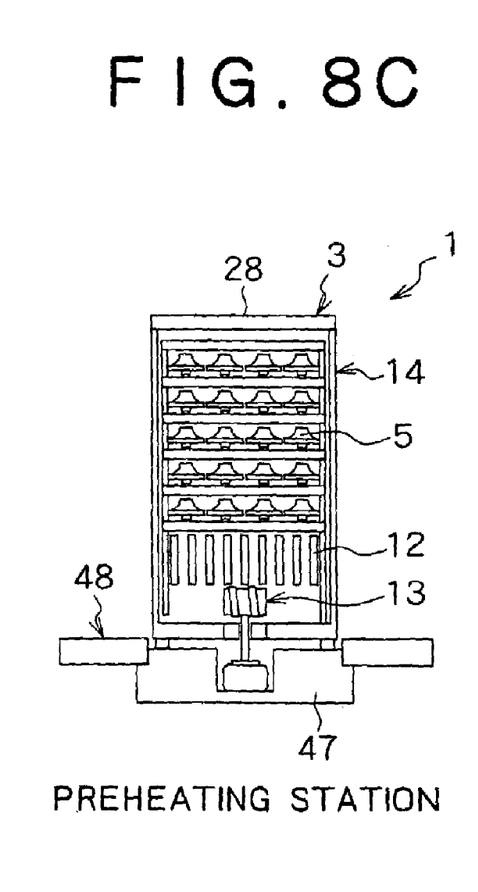

FIGS. 6 to 8 illustrate a second embodiment of the present invention.

In an electric furnace 3 according to this second embodiment, as shown in FIG. 6, the convection cylinder 29 used in the previous first embodiment is not used, but a cylindrical support member 36 serves as a pressure medium gas flowing guide.

A heat insulating structure 14 has a bottom wall 45 which closes a lower-end opening of a body portion 27, while an upper wall 28 which closes an upper-end opening of the body portion 27 is constructed so that it can be opened and closed.

A base heater 12 and a fan 13 are disposed above the bottom wall 45 in the interior of the heat insulating structure 14 and is supported by the heat insulating structure 14.

A motor 16 for driving the fan is disposed below the bottom wall 45 in the heat insulating structure 14 and an output shaft 24 of the motor 16 is connected to the fan 13 through the bottom wall 45 in the heat insulating structure 14, the motor 16 being supported by the heat insulating structure 14.

The support cylinder 34 is placed on the bottom wall 45 in the heat insulating structure 14 and a gas inlet port 46 is formed on a lower end side of the support cylinder 34 to let the pressure medium gas flow from the outside to the inside of the support cylinder 34.

In this second embodiment, workpieces 5, as well as the base heater 12 and the fan 13, can be taken out from a high-pressure vessel 2 together with the heat insulating structure 14. Besides, the base heater 12 and the fan 13 (and the motor 16) can be mounted to the lower lid 8 removably, and not only the workpieces 5, but also the base heater 12 and the fan 13 can be conveyed together with the heat insulating structure 14.

Electric wires such as lead wires for the supply of electric power to such electric devices as the base heater 12 and the fan driving motor 16, as well as signal lines from a temperature measuring member (thermocouple) and for controlling the revolution of the motor 16, are laid in the exterior of the high-pressure vessel 2 through the lower lid 8. The lower lid 8, as well as the base heater 12 and the motor 16, can be attached to and detached from each other so as to permit electric connection and disconnection.

In this second embodiment, as shown in FIG. 7, the pressure medium gas introduced sideways of the fan 13 into the fan is discharged upward from the fan 13 and flows forcibly upward through a treatment chamber 4 together with the pressure medium gas heated by the base heater 12 to heat the workpieces 5 present within the space formed by the cylindrical support member 36.

Upon arrival at an upper end of the treatment chamber 5, the pressure medium gas flows downward through the space formed outside the cylindrical support member 36 while being sucked with a suction force of the fan 13, then passes through the gas inlet port 46 formed on the lower end side of the support cylinder 34, enters the inside of the support cylinder, and reaches a side portion of the fan 13.

Other constructional points are almost the same as in the first embodiment.

FIG. 8 shows an example of an HIP apparatus 1 having the electric furnace 3 described above and also having, in addition to the HIP station, a preheating station for preheating the workpieces 5 and a cooling station for cooling the workpieces 5.

In this example, as the lower lid 8 is brought down, the electric furnace 3 is taken out below the high-pressure vessel 2 together with the lower lid 8.

In each of the preheating station and the cooling station there is installed a base 48 provided with a table 47 of substantially the same structure as the lower lid 8 of the high-pressure vessel 2, and the base heater 12 and the motor 16 are constructed so that they can be mounted onto the table 47 removably to permit electric connection and disconnection with respect to the table 47. The base heater 12 and the motor 16 can be operated in both stations.

Preheating is carried out in the preheating station as shown on the right-hand side of FIG. 8. That is, in the air, the upper wall 28 of the heat insulating structure 14 placed on the table 47 is removed and the workpieces 5, etc. are received into the treatment chamber 4, thereafter the upper wall 28 is again mounted onto the table 47, and the base heater 12 and the fan 13 are operated to preheat the workpieces 5.

When the preheating of the workpieces 5 is over, the whole of the electric furnace 3 is conveyed to the HIP station and the electric furnace 3 is mounted onto the lower lid 8 which lies in its descent position. Thereafter the lower lid 8 is raised, the electric furnace 3 is loaded into the high-pressure vessel 2, and HIP is carried out.

After the completion of HIP, the electric furnace 3 is conveyed to the cooling station, in which cooling such as slow cooling is performed. If the cooling rate for the workpieces 5 is to be controlled, the heat insulating structure 14 of the electric furnace 3 is placed into such a cooling casing 49 as shown on the left-hand side of FIG. 8. If rapid cooling is to be carried out, a cooling gas is introduced into the cooling casing 49.

Particularly, for rapid cooling, the upper lid 28 may be removed. In this case, the cooling gas introduced into the cooling casing 49 may be recycled into the treatment chamber 4 through the space present below the fan 13 by means of the fan.

Figure 9A:
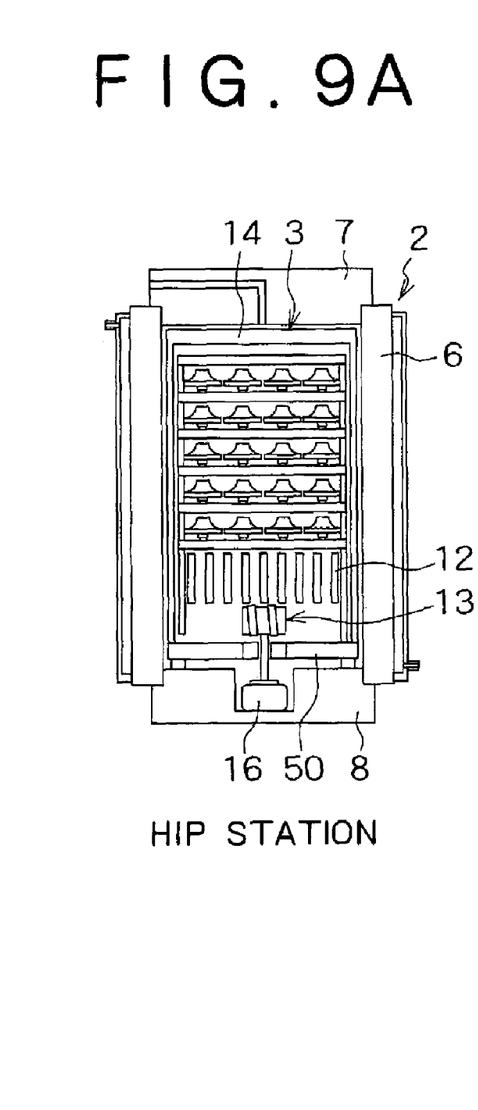
FIG. 9 is a construction diagram of an HIP apparatus according to a modification.
Figures 9B, 9C:
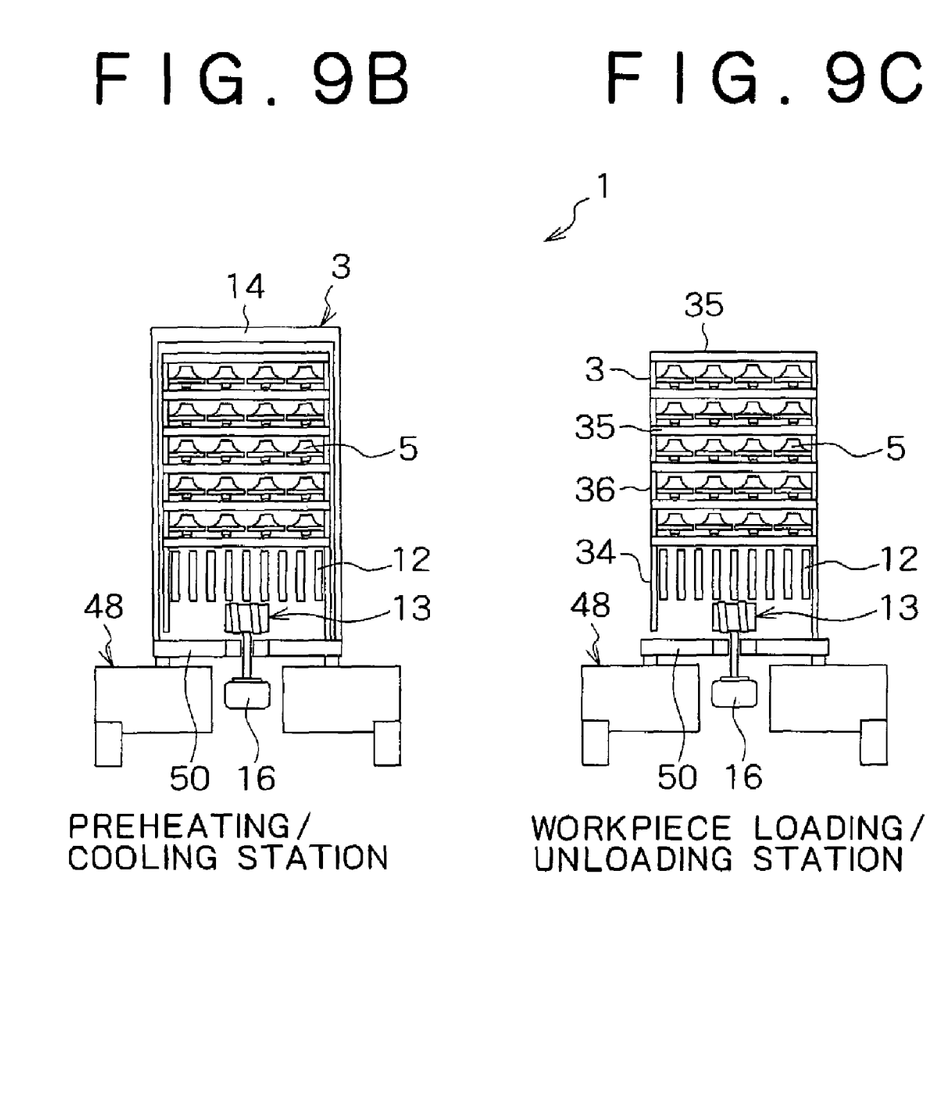

FIG. 9 shows another example of HIP apparatus 1, which is provided, in addition to the HIP station, a preheating/cooling station for preheating or cooling the workpieces 5 and a workpiece loading/unloading station for setting or taking out the workpieces 5.

An electric furnace 3 used in this example is provided with a table 50 for supporting base heater 12, support cylinder 34, heat insulating structure 14, fan 13 and motor 16 or the like.

The heat insulating structure 14 is of the same construction as in the first embodiment.

Other constructional points are the same as in the second embodiment.

In this example, the electric furnace 3 is constructed so that the whole thereof can be removed upward from the lower lid 8 of the high-pressure vessel 2, and loading and unloading of the workpieces 5 to and from the high-pressure vessel 2 are carried out by opening and closing the upper lid 7 of the high-pressure vessel 2.

For taking out the electric furnace 3 from the high-pressure vessel 2, the whole of the electric furnace 3 is pulled up after opening the upper lid 7.

Therefore, there is adopted a structure such that electric wiring lines such as a lead wire of the base heater 12, a signal line from a temperature measuring member (thermocouple), a lead wire for the supply of electric power to the fan driving motor 16, and a signal line for controlling the revolution of the motor 16, are connected or disconnected upon mounting or removal of the electric furnace 3 (in interlock with a mounting or removing operation for the lower lid 8 of the electric furnace 3), using a plug-in type connector.

The right-hand side of FIG. 9 shows in what condition the workpieces 5 are loaded into or unloaded from the electric furnace 3. For setting the workpieces 5, first the workpieces 5 are set above the support cylinder 34 with use of the workpieces bases 35 and the support member 36 and then the heat insulating structure 14 is applied to cover the workpieces 5.

For taking out the workpieces 5, only the heat insulating structure 14 is removed upward.

For preheating, as shown centrally in FIG. 9, the heat insulating structure 14 is conveyed in its mounted state to the preheating/cooling station from the workpiece loading/unloading station, then electric power is fed to the base heater 12 and the fan 13 is operated.

In each of the workpiece loading/unloading station and the preheating/cooling station there is provided a base 48 so that the electric furnace 3 can be mounted onto and removed from the base 48. In the preheating/cooling station, when the electric furnace 3 is mounted onto the base 48, there is made connection of electric wires as is the case with the HIP station.

Cooling can be done without operation of the fan 13 or the base heater 12. Where it is desired to suppress the occurrence of a vertical temperature distribution, the apparatus is allowed to stand under operation of the fan 13. For slow cooling, the base heater 12 may be operated.

If the cooling rate is to be controlled, the cooling casing 49 may be used as in FIG. 8.

The present invention is not limited to the above embodiments, but a change of design may be made as necessary.

What is claimed is:

1. A hot isostatic pressing apparatus for subjecting workpieces to hot isostatic pressing with use of a pressure medium gas, said apparatus comprising:
    a high-pressure vessel having a lower end opening and a removable lower lid, which can close said lower end opening;
    a treatment chamber provided within said high-pressure vessel to heat and press workpieces;
    a heat insulating structure which covers said treatment chamber sideways and from above, wherein said heat insulating structure is movable independently of said lower lid;
    a workpiece support mounted to said heat insulating structure so as to move with said heat insulating structure and independently of said lower lid;
    a base heater disposed below said treatment chamber to heat a pressure medium gas; and
    a fan disposed below said treatment chamber to supply the pressure medium gas in a heated state into the treatment chamber; wherein said heat insulating structure and workpieces can be taken out together from said high-pressure vessel and can be conveyed together separately from said lower lid.

2. The hot isostatic pressing apparatus according to claim 1, wherein said base heater and said fan are fixed to said lower lid, further comprising a station disposed in the exterior of said high-pressure vessel, wherein said base heater and said fan are fixed to said lower lid and wherein said station includes another heater and another fan having substantially the same functions as said base heater and said fan.

3. The hot isostatic pressing apparatus according to claim 1, further comprising a station disposed exterior to said high-pressure vessel, wherein said base heater and said fan are removably mounted to said lower lid, whereby said base heater and said fan can be taken out from the interior of said high-pressure vessel and conveyed together with said heat insulating structure and the workpieces.

4. The hot isostatic pressing apparatus according to claim 1, wherein said lower lid is movable vertically, and in a descended state of said lower lid said heat insulating structure can be removably mounted to said lower lid.

5. The hot isostatic pressing apparatus according to claim 1, further comprising an upper lid mounted to close an upper-end opening of said high-pressure vessel.

6. The hot isostatic pressing apparatus according to claim 1, further comprising a water quenching station including a water tank.

* * * * *

UNITED STATES PATENT AND TRADEMARK OFFICE
CERTIFICATE OF CORRECTION

PATENT NO. : 7,008,210 B2 Page 1 of 1
APPLICATION NO. : 10/437061
DATED : March 7, 2006
INVENTOR(S) : Manabe et al.

It is certified that error appears in the above-identified patent and that said Letters Patent is hereby corrected as shown below:

On the title page, Item (73), the Assignee Information is incorrect. Item (73) should read:

-- (73) Assignee: Kabushiki Kaisha Kobe Seiko Sho (Kobe Steel, Ltd.) Kobe (JP)--

Signed and Sealed this

Eighteenth Day of July, 2006

JON W. DUDAS
*Director of the United States Patent and Trademark Office*